(12) United States Patent
McConnell et al.

(10) Patent No.: US 7,545,762 B1
(45) Date of Patent: Jun. 9, 2009

(54) METHOD AND SYSTEM FOR NETWORK PRESENCE NOTIFICATION

(75) Inventors: Von K. McConnell, Leawood, KS (US); Lyle T. Bertz, Lee's Summit, MO (US); Arun Santharam, Overland Park, KS (US); Matthew Barrow, Overland Park, KS (US); Tania Mazza-Deblawe, Kansas City, MO (US); Jesse Money, Shawnee, KS (US); Ronald E. Lewis, Independence, MO (US); Charles E. Woodson, Peculiar, MO (US); Baoquan Zhang, Overland Park, KS (US); Daren R. Furness, Shawnee Mission, KS (US); Tracy Poffenroth, Grapevine, TX (US)

(73) Assignee: Sprint Spectrum L.P., Overland, KS (US)

( * ) Notice: Subject to any disclaimer, the term of this patent is extended or adjusted under 35 U.S.C. 154(b) by 1389 days.

(21) Appl. No.: 10/223,940

(22) Filed: Aug. 20, 2002

(51) Int. Cl.
*H04B 7/00* (2006.01)

(52) U.S. Cl. ............... 370/310.2; 370/338; 370/395.52; 709/206; 709/227

(58) Field of Classification Search ................ 370/352, 370/338, 310.2; 709/206, 227
See application file for complete search history.

(56) References Cited

U.S. PATENT DOCUMENTS

| | | | |
|---|---|---|---|
| 5,964,891 A * | 10/1999 | Caswell et al. ................. 714/31 |
| 6,119,160 A * | 9/2000 | Zhang et al. ................. 709/224 |
| 6,151,628 A | 11/2000 | Xu et al. |
| 6,161,008 A | 12/2000 | Lee et al. |
| 6,272,129 B1 | 8/2001 | Dynarski et al. |
| 6,308,267 B1 | 10/2001 | Gremmelmaier |
| 6,389,008 B1 | 5/2002 | Lupien et al. |
| 6,404,754 B1 | 6/2002 | Lim |
| 6,445,922 B1 | 9/2002 | Hiller et al. |
| 6,460,081 B1 | 10/2002 | Doherty et al. ............. 709/225 |
| 6,463,055 B1 | 10/2002 | Lupien et al. |
| 6,466,571 B1 | 10/2002 | Dynarski et al. |
| 6,469,998 B1 | 10/2002 | Burgaleta Salinas et al. |
| 6,473,609 B1 | 10/2002 | Schwartz et al. |
| 6,483,822 B1 | 11/2002 | Lioy et al. |

(Continued)

FOREIGN PATENT DOCUMENTS

WO    WO 00/04689    1/2000

(Continued)

OTHER PUBLICATIONS

Internet Engineering Task Force, Request for Comments 2138, "Remote Authentication Dial in User Service (RADIUS)," C. Rigney, Apr. 1997.

(Continued)

*Primary Examiner*—Phuc H Tran

(57) ABSTRACT

In a packet-switched network, a subscribing application subscribes to a network presence server to receive selected network presence information. The network presence server obtains the selected network presence information, at least in part, from status messages that a network access server, such as a packet data serving node (PDSN), sends, for example, to an accounting server. The network presence server then provides the selected network presence information to the subscribing application. The selected network presence information may include an identification of a particular customer that has just initiated or terminated a data session and the network address the particular customer is or was using.

14 Claims, 4 Drawing Sheets

U.S. PATENT DOCUMENTS

| | | | |
|---|---|---|---|
| 6,658,095 B1 * | 12/2003 | Yoakum et al. | 379/93.01 |
| 6,944,150 B1 * | 9/2005 | McConnell et al. | 370/352 |
| 6,985,479 B2 | 1/2006 | Leung et al. | |
| 7,065,067 B2 * | 6/2006 | Song et al. | 370/338 |
| 7,123,594 B2 * | 10/2006 | Yang | 370/328 |
| 7,136,372 B1 * | 11/2006 | Nilsen | 370/352 |
| 7,165,122 B1 | 1/2007 | Sitaraman et al. | |
| 7,305,429 B2 | 12/2007 | Borella | |
| 2001/0028636 A1 | 10/2001 | Skog et al. | 370/328 |
| 2001/0034224 A1 | 10/2001 | McDowell et al. | 455/412 |
| 2002/0035605 A1 | 3/2002 | McDowell et al. | 709/206 |
| 2002/0077897 A1 | 6/2002 | Zellner et al. | |
| 2002/0086672 A1 | 7/2002 | McDowell et al. | 455/432 |
| 2002/0116338 A1 * | 8/2002 | Gonthier et al. | 705/52 |
| 2002/0126701 A1 * | 9/2002 | Requena | 370/469 |
| 2002/0186696 A1 * | 12/2002 | Lim | 370/395.52 |
| 2002/0187781 A1 | 12/2002 | Furlong | 455/433 |
| 2003/0018704 A1 | 1/2003 | Polychronidis et al. | 709/202 |
| 2003/0028621 A1 | 2/2003 | Furlong et al. | 709/219 |
| 2003/0046400 A1 * | 3/2003 | Friel et al. | 709/228 |
| 2003/0048195 A1 | 3/2003 | Trossen | |
| 2004/0003046 A1 * | 1/2004 | Grabelsky et al. | 709/206 |
| 2004/0009761 A1 * | 1/2004 | Money et al. | 455/406 |
| 2004/0141500 A1 * | 7/2004 | Pavlak et al. | 370/389 |

FOREIGN PATENT DOCUMENTS

| | | |
|---|---|---|
| WO | WO 01/78425 A1 | 10/2001 |
| WO | WO 02/43351 A2 | 5/2002 |

OTHER PUBLICATIONS

Internet Engineering Task Force, Request for Comments 2139, "(RADIUS)/Accounting," C. Rigney, Apr. 1997.

Internet Engineering Task Force, Request for Comments 2846, "The Network Access Identifier," B. Aboba, Jan. 1999.

Internet Engineering Task Force, Request for Comments 3261, "SIP: Session Initiation Protocol," J. Rosenberg, Jun. 2002.

Internet Engineering Task Force, Internet Draft, "A Lightweight Presence Information Format (LPIDF)," J. Rosenberg, et al., Jun. 2000.

Internet Engineering Task Force, Internet Draft, "Event Notification in SIP," A. Roach, Nov. 2000.

Internet Engineering Task Force, Internet Draft, "SIP Extensions for Presence," J. Rosenberg, et al., Mar. 2001.

Internet Engineering Task Force, Internet Draft, "SIP-Specific Event Notification," A. Roach, Jul. 2001.

Internet Engineering Task Force, Internet Draft, "Session Initiation Protocol (SIP) Extensions for Presence," J. Rosenberg, May 2002.

Internet Engineering Task Force, Internet Draft, "Diameter Base Protocol," P. Calhoun, Jun. 2002.

"Wireless Application Protocol WAP 2.0 Technical White Paper," Wireless Application Protocol Forum Ltd. Jan. 2002.

"Wireless Application Group User Agent Profile Specification," Wireless Application Protocol Forum Ltd., Nov. 1999.

"Composite Capability/Preference Profiles (CC/PP): A user side framework for content negotiation," W3C Note Jul. 27, 1999, http://www.w3or/TR/1999/NOTE-CCPP-19990727.

"Composite Capabilities/Preference Profiles: Requirements and Architecture," W3C Working Draft Jul. 21, 2000, http://www.w3.org/TR/2000/WD-CCPP-ra-20000721/.

Composite Capability/Preference Profiles (CC/PP): Structure and Vocabularies, W3C Working Draft Mar. 15, 2001, http://www.w3.org/TR/2001/WD-CCPP-struct-vocab-20010315.

Internet Engineering Task Force, Internet Draft, "Network Intelligence for Presence Enhanced Communication," Montgomery, et al, Nov. 2001.

Internet Engineering Task Force, Internet Draft, "The SPIRITS Protocol," Gurbani, et al., Feb. 2002.

Internet Engineering Task Force, Request for Comments 3265, "Session Initiation Protocol (SIP)—Specific Event Notification," A.B. Roach, Jun. 2002.

3rd Generation Partnership Project 2 "Wireless IP Network Standard," 3GPP2 P.S0001-A, Version 3, Jul. 16, 2001.

* cited by examiner

METHOD AND SYSTEM FOR NETWORK PRESENCE NOTIFICATION

BACKGROUND

1. Field of the Invention

The present invention relates to telecommunications and, more particularly, to methods and systems for obtaining and providing network presence information.

2. Description of Related Art

Wireless telecommunications technologies are continuing to develop in order to provide enhanced multimedia (e.g., data) service to wireless devices. The effort is currently referred to as third-generation wireless or "3G." For example, the IS-2000 specification describes a CDMA air interface for 3G, and the IS-835 specification and various specifications of the Third Generation Partnership Project 2 ("3GPP2") describe the operation of third-generation wireless networks.

As presently envisioned, a 3G network includes a packet-switched network that wireless customers can access to connect to the Internet, browse the World Wide Web, send and receive e-mails, etc. One difficulty in providing such services to wireless customers is that they often use devices, such as wireless telephones and personal digital assistants (PDAs), that have limited capabilities. For example, such devices may not be able to display the graphics that laptop and desktop computers are able to display because of less pixel resolution, less color resolution, and/or smaller screens. In addition, handheld wireless devices often have differently-structured user interfaces, such as smaller keypads or pen-based input. As a result, while most Web content is currently written in the HyperText Markup Language (HTML), Web browsers on handheld wireless devices often require Web content to be written in specialized markup languages, such as the Wireless Markup Language (WML) or the Handheld Device Markup Language (HDML), or in specialized versions of HTML, such as cHTML or xHTML.

To accommodate such wireless customers, the 3G network may include various applications to provide service tailored to devices with limited capabilities. For example, the 3G network may include a Web gateway that wireless customers access to receive Web content, e.g., by using the Wireless Application Protocol (WAP). The Web gateway may receive content from a content server at a URL specified by the customer and then transcode or render the content to facilitate its display on the particular device the wireless customer is using. The Web gateway may also apply a customer's preferences when providing the content to the customer. As a result, it is preferable for the Web gateway to have information regarding the particular customer and wireless device receiving the content in order to transcode or render the content appropriately and in order to apply the customer's preferences.

In many implementations, however, the Web gateway or other application may not be able to obtain reliable information identifying the customer it is serving or the particular device the customer is using. For example, the Web gateway or other application may only know the IP address of the customer it is serving. In many cases, this IP address does not reliably identify the customer because it may be dynamically assigned. Thus, a particular customer may use a particular IP address only for a particular session. When that customer's session ends, e.g., because the customer has logged off, turned off the wireless device, moved out of range, or for some other reason, the same IP address may be assigned to a different customer. This may lead to the undesirable situation of the Web gateway or other application applying the first customer's profile to the second customer simply because the second customer was assigned the same IP address. In addition, the customer's IP address does not typically indicate what device the customer is using for network access. Indeed, even the identity of the customer may not reliably indicate what device the customer is using, because a customer may use different devices with different capabilities to access the network at different times.

Accordingly, there is a need to obtain reliable information regarding what IP address a particular customer is using and what type of device the customer is using for network access.

SUMMARY

In a first principal aspect, the present invention provides a method for network presence notification in a packet-switched network in which a first network element provides network access to customers and sends status messages to a second network element regarding services provided to customers. In accordance with the method, selected network presence information is obtained, at least in part, from the status messages, and the selected network presence information is provided to at least one destination.

In a second principal aspect, the present invention provides a system for managing network presence information in a packet-switched network in which a network access server provides network access to customers and generates status messages regarding services to customers. The system comprises a network presence server and a network presence monitor. The network presence monitor obtains network presence information and provides it to the network presence server.

In a third principal aspect, the present invention provides a method for providing content to a customer. In accordance with the method, a network presence message and an access request are received. The network presence message identifies a customer and a valid network address of the customer. The access request requests access to selected content and identifies a destination network address. A determination is made whether the destination network address corresponds to the valid network address. If the addresses correspond, then the selected content is provided to the destination address.

In a fourth principal aspect, the present invention provides a system for providing content to customers. The system comprises a content gateway and a network presence server. The content gateway provides content to valid customers at valid network addresses. The network presence server obtains network presence information and provides it to the content gateway. The network presence information identifies the valid network addresses of the valid customers.

DETAILED DESCRIPTION OF EXEMPLARY EMBODIMENTS

1. Exemplary Architecture

Figure 1:
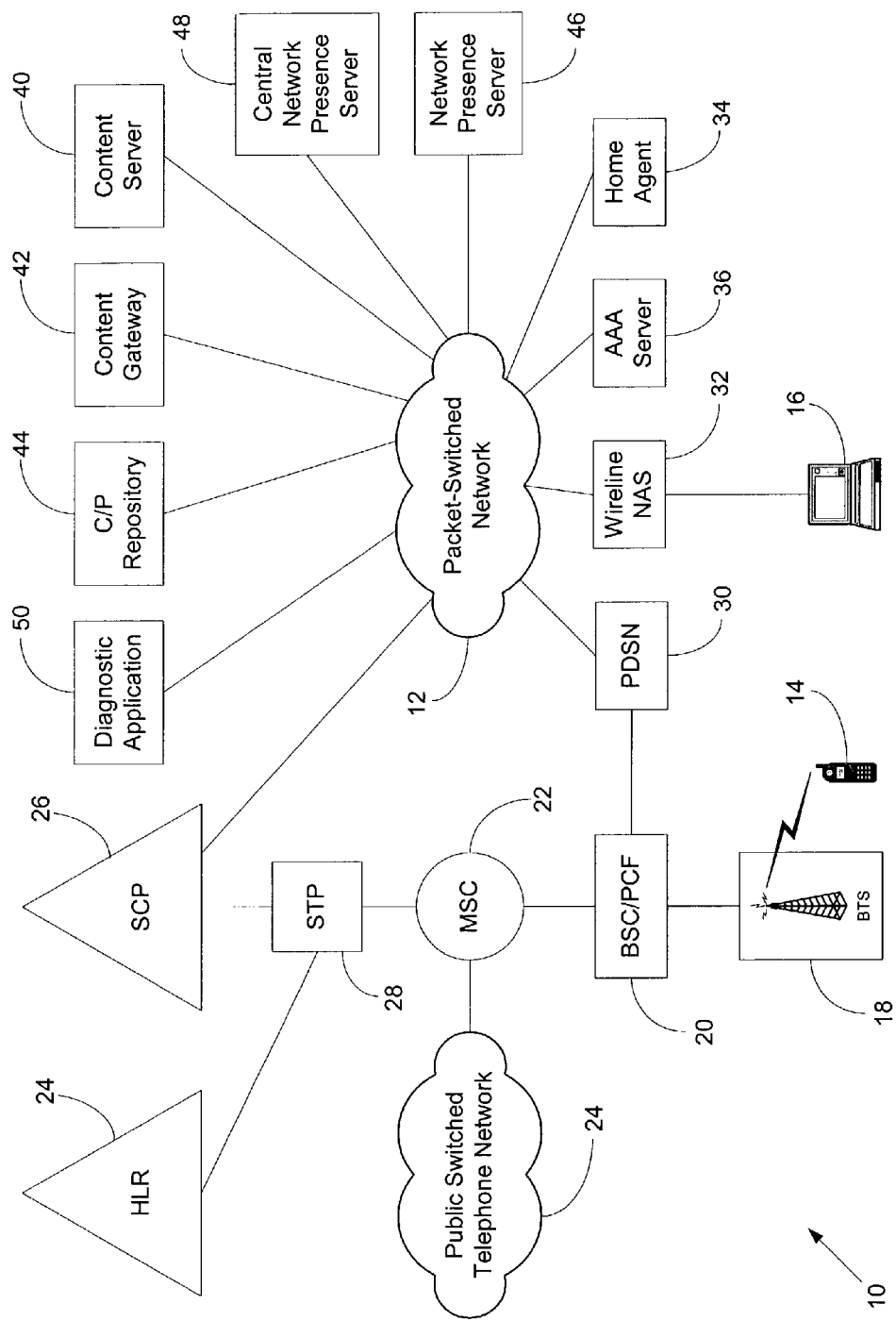
FIG. 1 is a simplified block diagram of a wireless telecommunications system, in accordance with an exemplary embodiment of the present invention.

Referring to the drawings, FIG. 1 is a simplified block diagram of an exemplary telecommunications system 10 in which exemplary embodiments of the present invention may be employed. Telecommunications system 10 includes a packet-switched network 12. Packet-switched network 12 may include one or more wide area networks (WANs) and/or one or more local area networks (LANs). Packet-switched network 12 may include one or more public networks, such as the Internet, and/or one or more private networks. Packets may be routed in packet-switched network 12 using the Internet Protocol, and devices in communication with packet-switched network 12 may be identified by a network address, such as an Internet Protocol (IP) address.

A customer may use a customer device for communicating over packet-switched network 12. The customer device may be a wireless device, such as wireless device 14. Wireless device 14 may be a wireless telephone, a personal digital assistant (PDA), a wirelessly equipped laptop computer, or other type of wireless communication device, i.e., a communication device that communicates over an air interface. Alternatively, the customer device may be a wireline device, such as wireline device 16. Although wireline device 16 is shown as a laptop computer in FIG. 1, wireline device 16 may be a desktop computer, PDA, or other device that communicates over a physical interface other than an air interface. In some cases, a given customer device may have both wireless and wireline communication capability. In addition, a customer may, at different times, use different types of wireless and/or wireline devices to communicate over packet-switched network 12. In some cases, a customer may be able to use more than one customer device at a time to communicate over packet-switched network 12.

To provide communications to wireless customer devices, wireless telecommunications system 10 may includes a base transceiver station (BTS) 18 that provides a wireless coverage area. BTS 18 may communicate over an air interface with one or more wireless communication devices, such as wireless device 14, located in its wireless coverage area. The communications between BTS 18 and wireless device 14 may occur in a digital format, such as CDMA, TDMA, GSM, or 802.11x, or they may occur in an analog format, such as AMPS. A preferred wireless communications format is "CDMA 2000," such as described in EIA/TIA/IS-2000 Series, Rev. A (published March 2000), which is incorporated herein by reference.

BTS 18 may be controlled by a base station controller (BSC) 20, which, in turn, may be controlled by a mobile switching center (MSC) 22. MSC 22 may be connected to the public switched telephone network (PSTN) 24. MSC 22 may able to communicate with a home location register (HLR) 24 and a service control point (SCP) 26, typically, via one or more signal transfer points (STPs), such as STP 28. Although FIG. 1 shows MSC 22 connected to one BSC and shows BSC 20 connected to one BTS, in general, MSC 22 may be connected to more than one BSC and each BSC, such as BSC 20, may be connected to more than one BTS.

MSC 22 may use a signaling system, such as SS7, to route calls through PSTN 24. The signaling between MSC 22 and HLR 24 may conform to IS-41 specifications. A recent revision of the IS-41 specifications, ANSI-41 Rev. D, published in July 1997, is incorporated herein by reference. The signaling between MSC 22 and SCP 26 may conform to the specification "Wireless Intelligent Network," TIA/EIA/IS-771, published in July 1999, which is incorporated herein by reference. Other signaling protocols could be used, however. By the use of such signaling, MSC 22, BSC 20, and BTS 18 may be able to connect incoming calls from PSTN 24, which calls may originate from landline telephones, mobile stations, or other communication devices, to wireless device 14. Similarly, serving MSC 22, BSC 20, and BTS 18 may be able to connect calls originating from wireless device 14 through PSTN 24.

To provide wireless customer devices, such as wireless device 14, access to packet-switched network 12, BSC 20 may include a packet control function (PCF), and a packet data serving node (PDSN) 30 may connect BSC/PCF 20 to packet-switched network 12. The communications between BSC/PCF 20, MSC 22, and PDSN 30 may conform to "third generation" (3G) wireless network specifications. Examples of such 3G specifications include "Wireless IP Network Standard," 3GPP2 P.S0001-A, dated Jul. 16, 2001 and "3GPP2 Access Network Interfaces Interoperability Specification," 3GPP2 A.S0001-A, dated June 2001, which are incorporated herein by reference. Briefly stated, under these 3G specifications, when wireless device 14 requests packet data service, BSC/PCF 20 may engage in signaling with MSC 22 and with PDSN 30 to authenticate and authorize wireless device 14 and to set up a data link with PDSN 30. If this process is successful, a point-to-point protocol (PPP) session is established between wireless device 14 and PDSN 30. PDSN 30 then acts as a network access server, providing wireless device 14 access to packet-switched network 12.

Telecommunications network 10 may also include a wireline network access server (NAS) 32 to provide wireline customer devices, such as wireline device 16, access to packet-switched network 12. A wireline customer device may, for example, be able to connect to wireline NAS 32 via a telephone line (e.g., by using a modem), digital subscriber line (DSL), data-over-cable system, T1 line, or some other wired connection.

A customer device communicatively coupled to packet-switched network 12 is typically identified by a network address, such as an IP address. The customer device may use either Simple IP or Mobile IP, and its IP address may be dynamically assigned. In a Simple IP process, PDSN 30 dynamically assigns IP addresses to wireless customer devices, such as wireless device 14, communicating with it, and wireline NAS 32 dynamically assigns IP addresses to wireline customer devices, such as wireline device 16, communicating with it.

In a Mobile IP process, wireless device 14 may send a registration request, via PDSN 30, to a home agent 34 associated with wireless device 14. If home agent 34 approves the registration request, home agent 34 may dynamically assign wireless device 14 an IP address, or wireless device 14 may use an IP address permanently assigned to it. Wireline NAS 32 may similarly forward Mobile IP requests from wireline customer devices communicating with it, such as wireline device 16, to home agent 34. Relevant aspects of Mobile IP are described in C. Perkins, "IP Mobility Support," Request for Comments 2002 (October 1996) and P. Calhoun and C. Perkins, "Mobile IP Network Access Identifier Extension for Ipv4," Request for Comments 2794 (March 2000), which are incorporated herein by reference.

PDSN 30 and wireline NAS 32 may also exchange messages with an authentication, authorization, and accounting (AAA) server 36, such as via packet-switched network 12. This communication may conform to the RADIUS protocols specified in "Remote Authentication Dial In User Service (RADIUS)," Request For Comments 2138 (April 1997) and "RADIUS Accounting," Request For Comments 2139 (April 1997), which are incorporated herein by reference. Alternatively, the communications with AAA server 36 may conform to the DIAMETER protocol specified in Calhoun, et al., "Diameter Base Protocol," Internet-Draft (June 2002), or to some other protocol.

PDSN 30 and wireline NAS 32 may query AAA server 36 to authenticate and authorize requests by customer devices, such as wireless device 14 or wireline device 16, for access to packet-switched network 12. PDSN 30 may also send to AAA server 36 status messages, such as RADIUS accounting START and STOP messages, regarding the services provided to wireless customer devices. In accordance with the RADIUS accounting protocol, PDSN 30 may generate a RADIUS accounting START message when PDSN 30 begins transmitting data to or receiving data from wireless device 14. Thus, a RADIUS accounting START message typically indicates that a new data session has been initiated or that an existing data session that was dormant has become active.

In accordance with the RADIUS accounting protocol, PDSN 30 may generate a RADIUS accounting STOP message when the data session of wireless device 14 becomes dormant. The data session becomes dormant when no data traffic to or from wireless device 14 occurs for a certain period of time, such as ten seconds. PDSN 30 also generates a RADIUS accounting STOP message when the data session of wireless device 14 has terminated. The data session may terminate because wireless device 14 has logged out, turned off, moved out of range, or because no data traffic has occurred over a sufficient period of time. A RADIUS accounting STOP message may include a count of the number of data bytes transmitted to wireless device 14 and a count of the number of data bytes received from wireless device 14. A RADIUS accounting STOP message may also indicate whether the data session of wireless device 14 has ended or is simply dormant, i.e., is being continued. Wireline NAS 32 may send similar status messages, i.e., RADIUS accounting START and STOP messages, to AAA server 36 regarding the services provided to wireline customer devices, such as wireline device 16.

Although FIG. 1 shows only one PDSN, wireline NAS, AAA server, and home agent connected to packet-switched network 12, in general, multiple PDSNs, wireline NASs, AAA servers, and home agents may be connected to network 12. Moreover, each AAA server may be associated with a particular set of one or more PDSNs and/or wireline NASs, in that those PDSNs and/or wireline NASs send authentication requests and status messages to that particular AAA server.

When communicating over packet-switched network 12, customer devices, such as wireless device 14 or wireline device 16, may receive content from one or more content servers, such as content server 40. Such content may include voice, text, data, software, graphics, video, or other media. Content server 40 may be a Web server, e-mail server, streaming multimedia server, or other application that originates content. Content server 40 may provide content in response to a request from a customer device. Alternatively, content server 40 may push content to a customer device.

Content server 40 may provide content to customer devices via a content gateway 42. Content gateway 42 may transcode or render the content to tailor it for a particular type of customer device. Content gateway 42 may also apply customer preferences in providing the content to a particular customer. To find out how to transcode or render the content and what a customer's preferences are, content gateway 42 may obtain a profile of device capabilities and customer preferences from a capabilities and preferences (C/P) repository 44.

Content gateway 42 may also perform other functions. For example, in some embodiments customer devices may communicate with content server 40 via the Wireless Application Protocol (WAP), in which case content gateway 42 may function as a WAP proxy or gateway. Although content gateway 42 is shown as one network element in FIG. 1, content gateway 42 may be a distributed system made up of multiple servers, proxies, and/or gateways.

Telecommunications network 10 may also include a network presence server 46. As described in more detail below, network presence server 46 is an application that obtains network presence information, i.e., information regarding the network presence of customer devices and provides the network presence information to at least one destination. As used herein, the "network presence" of a customer device refers to the state of its connectivity with packet-switched network 12. Thus, network presence information may encompass such information as whether the customer device has a network connection and, if so, any information that relates to that network connection, such as network addresses that relate to the customer device, the identity of the customer and customer device, and the state of the customer device's data session, such as whether it is active or dormant.

Network presence server 46 may be provided as machine language instructions stored in a data store and executable by one or more processors, such as microprocessors. The data store may be volatile, such random access memory (RAM), or it may be non-volatile, such as read-only memory (ROM), magnetically encoded tape, magnetically encoded disk, or optically encoded disk.

In some embodiments, network presence server 46 may be a stand-alone network element, such as shown in FIG. 1. In other embodiments, network presence server 46 may be co-located with another network element, such as AAA server 36. In still other embodiments, network presence server 46 may be distributed over multiple network elements.

Various destinations may receive the network presence information from network presence server 46. The destination may be an application that provides content to customer devices, such as content server 40 or content gateway 42. In other cases, the destination may be an application that serves other functions. For example, the application may be a diagnostic application 50 used for troubleshooting. The destination may also be a data store that stores network presence information.

The destination or destinations may also include a central network presence server 48. As noted above, multiple AAA servers may be connected to packet-switched network 12. Thus, telecommunications network 10 may include multiple network presence servers, with each network presence server being associated with a particular set of one or more AAA servers. As a result, each network presence server may have network presence information with respect to only part of telecommunications network 10. However, network presence servers may forward some or all of their network presence information to central network presence server 48. In this way, central network presence server 48 may serve as a central repository of network presence information that other network elements can then query as needed.

Network presence server 46 may include a Session Initial Protocol (SIP) client for communicating with other network elements. Relevant aspects of SIP are described in J. Rosenberg, et al., "SIP: Session Initiation Protocol," Request For Comments 3261 (June 2002) and in A. Roach, "SIP-Specific Event Notification," Internet Draft (July 2001), which are incorporated herein by reference. However, network presence server 46 may use other protocols instead of, or in addition to, SIP.

2. Exemplary Operation

Figure 2:
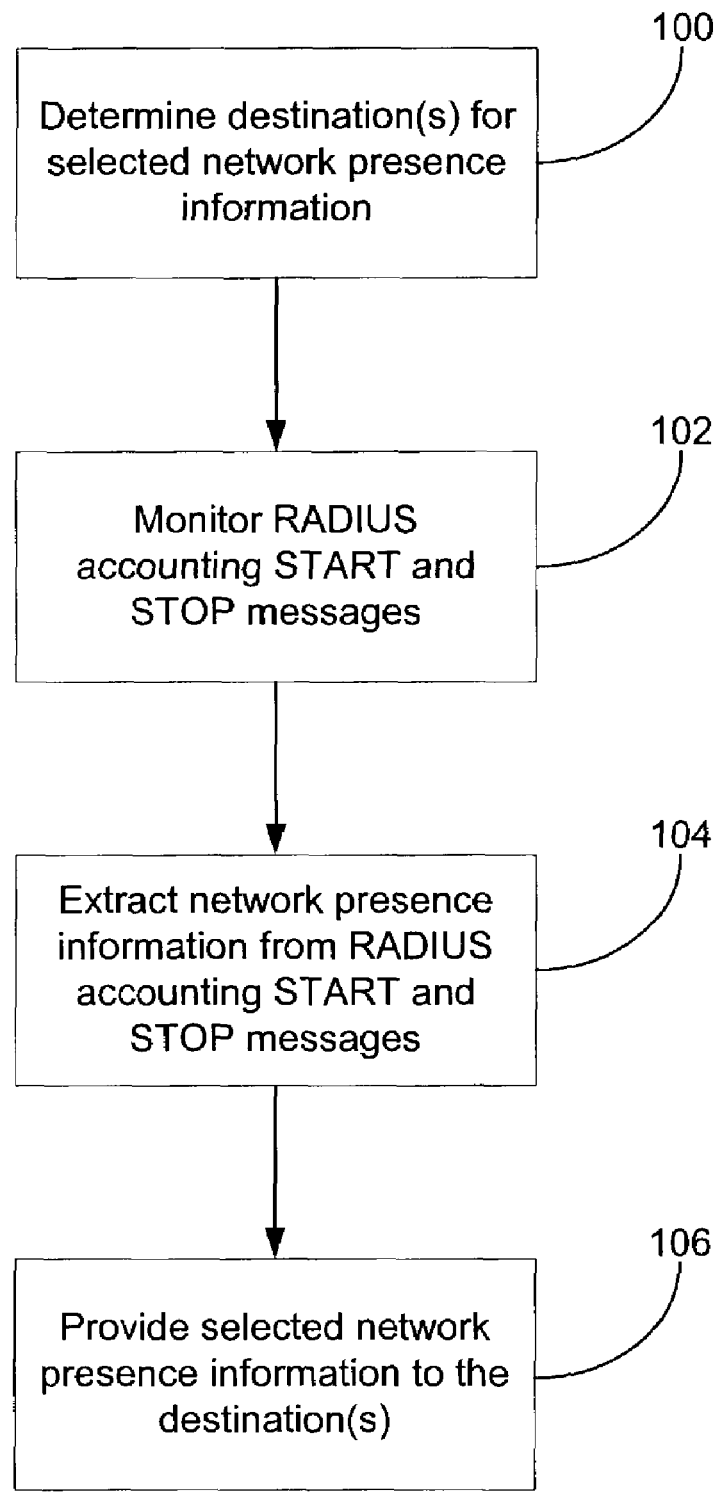
FIG. 2 is a flow chart, in accordance with an exemplary embodiment of the present invention.

FIG. 2 is a flow chart illustrating, at a high level, an exemplary method of obtaining and providing network presence information. This exemplary method may be carried out by network presence server 46 alone or by network presence server 46 in combination with one or more other network elements, such as AAA server 36.

In the first step, indicated by block 100, network presence server 46 determines which destination or destinations are to receive network presence information. In a preferred embodiment, network presence server 46 makes this determination based on a SIP SUBSCRIBE message that it receives. The SIP SUBSCRIBE message may identify, such as by network address, one or more destinations to receive the network presence information. The SIP SUBSCRIBE message may be sent by a network element corresponding to one of the identified destinations, or the message may be sent some other network element.

The SIP SUBSCRIBE message may also specify what types of network presence information each destination is to receive. The requested network presence information may include an identification of each customer and the network address being used by each customer. For example, a customer may be identified by a network access identifier (NAI). The NAI may conform to B. Aboba, "The Network Access Identifier," Request for Comments 2486 (January 1999), which is incorporated herein by reference. The customer's network address may be an IP address dynamically assigned to a particular customer device being used by the customer to access packet-switched network 12. The requested network presence information could also include the home agent address of the customer device (if Mobile IP is used), the mobile identification number (MIN) of the customer device (for the case of wireless customer devices), and session status information. Such session status information may include whether the customer device has begun or ended a network connection and/or whether the customer device is engaged in an active or dormant data session. The network presence information could also include other types of information, such as an identification of the type of device being used by the customer.

The SIP SUBSCRIBE message may also include filtering criteria specifying for which customers or customer devices a destination is to receive the selected network presence information. For example, the SIP SUBSCRIBE message may specify that a certain destination is to receive network presence information only for customer devices that use a particular home agent.

Finally, the SIP SUBSCRIBE message may specify when each destination is to receive the selected network presence information. For example, the SIP SUBSCRIBE message may specify that a destination is to receive the selected network presence information whenever a session begins or ends. In other cases, the SIP SUBSCRIBE message may specify that a destination is to receive the selected network presence information whenever the data session goes from active to dormant or vice versa, or that a destination is to receive the selected network presence information at regular time intervals.

In place of, or in addition to, receiving SIP SUBSCRIBE messages, the destinations for network presence information may be determined in other ways. For example, one or more default destinations may be used. Alternatively, other network elements may be queried to determine destinations for network presence information. Similarly, the types of network presence information to send, filtering criteria, and the times to send the network presence information may be determined by default or by querying another network element, instead of, or in addition to, relying on SIP SUBSCRIBE messages or any other type of message.

As indicated by block 102, status messages generated by PDSN 30 and/or wireline NAS 32, such as RADIUS accounting START and STOP messages, are continually monitored for selected network presence information. As noted above, PDSN 30 and wireline NAS 32 typically generate RADIUS accounting START and STOP messages and transmit them to AAA server 36. RADIUS accounting START and STOP messages typically include much useful network presence information. In this regard, each RADIUS accounting START and STOP message normally includes the NAI of the customer, the IP address being used by the customer device, the home agent of the customer device (if Mobile IP is being used), and the MIN of the customer device (if it has a MIN assigned to it). However, if a destination is to receive network presence information that cannot be gleaned from RADIUS accounting START and STOP messaged, then other information sources may also be monitored or queried.

If network presence server 46 is co-located with AAA server 36, then network presence server 46 may simply monitor the status messages that AAA server 36 receives. If network presence server 46 is a separate network element from AAA server 36, then AAA server 36 may forward the status messages it receives to network presence server 46. Alternatively, PDSN 30 and wireline NAS 32 may copy network presence server 46 on the status messages sent to AAA server 36, or network presence server 46 may query AAA server to obtain the status messages.

In any event, when the selected network presence information is encountered in the status messages, it is extracted, as indicated by block 104. The extracted network presence information may be stored in a data store, and it may be reviewed to determine whether any destination is to be notified of it. As indicated by block 106, one or more destinations are then provided with selected network presence information. This step may be accomplished by transmitting a SIP NOTIFY message containing the selected network presence information to each destination meant to receive it. However, the network presence information could be provided to each destination in other ways.

Figure 3:
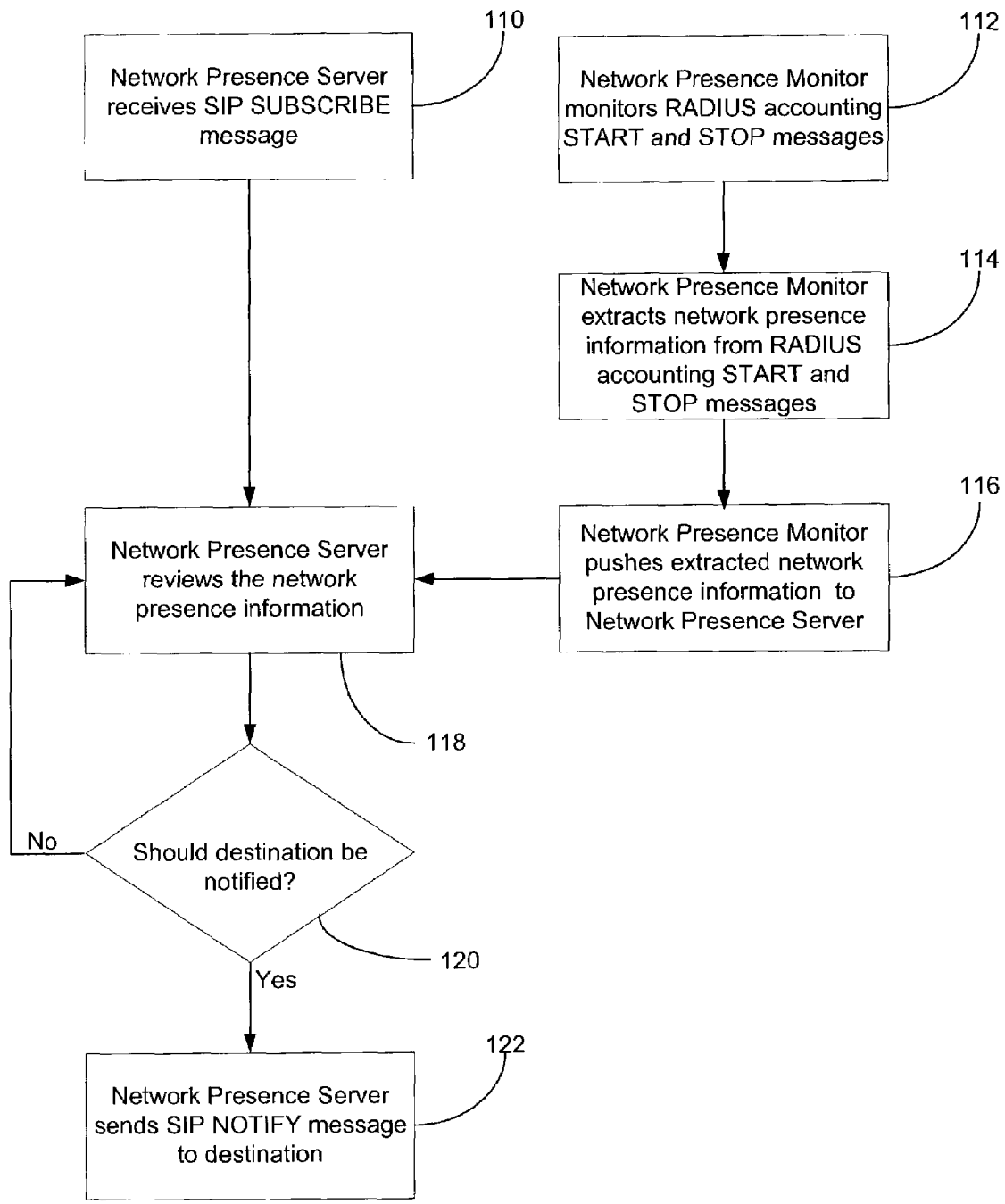
FIG. 3 is a flow chart, in accordance with an exemplary embodiment of the present invention.

FIG. 3 is a flow chart illustrating a more detailed example. In this example, network presence server 46 operates in conjunction with a network presence monitor that monitors RADIUS accounting START and STOP messages, extracts network presence information from the messages, and pushes the extracted information to network presence server 46, as described in more detail below. Various network elements could be used as such a network presence monitor. For example, since AAA server 36 normally receives RADIUS accounting START and STOP messages, AAA server 36 may be programmed to function as a network presence monitor. Alternatively, the network presence monitor may be a network element separate from AAA server 36.

The exemplary process of FIG. 3 begins with content gateway 42 sending a SIP SUBSCRIBE message to network presence server 46, as summarized in block 110. The SIP SUBSCRIBE message requests notification of the customer's NAI and IP address whenever a customer with home agent 34 begins and ends a session. In response, network presence server 46 sets content gateway 42 as the destination and waits to receive network presence information that satisfies the notification criteria set forth in the SIP SUBSCRIBE message.

Meanwhile the network presence monitor, e.g., AAA server 36, continually monitors the RADIUS accounting START and STOP messages from PDSN 30 and/or wireline NAS server 32 for selected network presence information, as indicated by block 112. The messages may be monitored for only the network presence information requested in the SIP SUBSCRIBE message, i.e., NAI and IP address. Alternatively, the network presence monitor may also monitor the messages for other types of network presence information, such as MIN and home agent address. The network presence monitor may apply the filtering criterion set in the SIP SUBSCRIBE message, i.e., may monitor only messages from customer devices with home agent 34. Alternatively, the network presence monitor may monitor a larger set of messages, and network presence server 46 may do the requested filtering.

The network presence monitor extracts the network presence information it monitors from RADIUS accounting START and STOP records, as indicated by block 114. The network presence monitor pushes the extracted network presence information to network presence server 116. When network presence server 46 receives new network presence information, network presence server 46 reviews it, as indicated by block 118. In particular, network presence server determines whether any destination should be notified of the network presence information, as indicated by block 120. Thus, in this example, network presence server 46 would determine whether the network presence information includes any of the network presence information requested in the SIP SUBSCRIBE message, i.e., NAI and IP address, whether it meets the filtering criteria, i.e., corresponds to a customer device with home agent 34, and whether it meets the timing criteria, i.e., corresponds to a data session either being initiated or terminated. As noted above, a RADIUS accounting START message corresponds to the beginning of a new session when the session involving the NAI and IP address was not previously dormant. A RADIUS accounting STOP message corresponds to the end of a session when it does not include a flag indicating the session is being continued, i.e., that the session has simply become dormant.

If the new network presence information meets the criteria for notifying the destination, then network presence server 46 sends the destination a SIP NOTIFY message containing the new network presence information, as indicated by block 122. Thus, in this example, network presence server 46 would send content gateway 42 a SIP NOTIFY message containing the customer NAI and IP address and an indication whether the customer's data session has begun or ended. In this way, content gateway 42 may be notified when the network presence of customers begins and ends and also which customer NAIs correspond to which IP addresses that content gateway 42 may encounter. If the new network presence information does not need to be sent to any destination, then network presence server 46 may store it and go back to the state of reviewing any new network presence information that is pushed to it.

As noted above, content gateway 42 is only one example of a destination that network presence server 46 may send network presence information. In general, the destination may be any application, data store, or any other destination that network presence server 46 identifies to receive network presence information. The selected network presence information sent to a destination may also include parameters other than NAI and IP address. In addition to the beginning and ending of sessions, network presence server 46 may send a destination the selected network presence information at other times, such as when the session status changes from active to dormant or from dormant to active.

Figure 4:
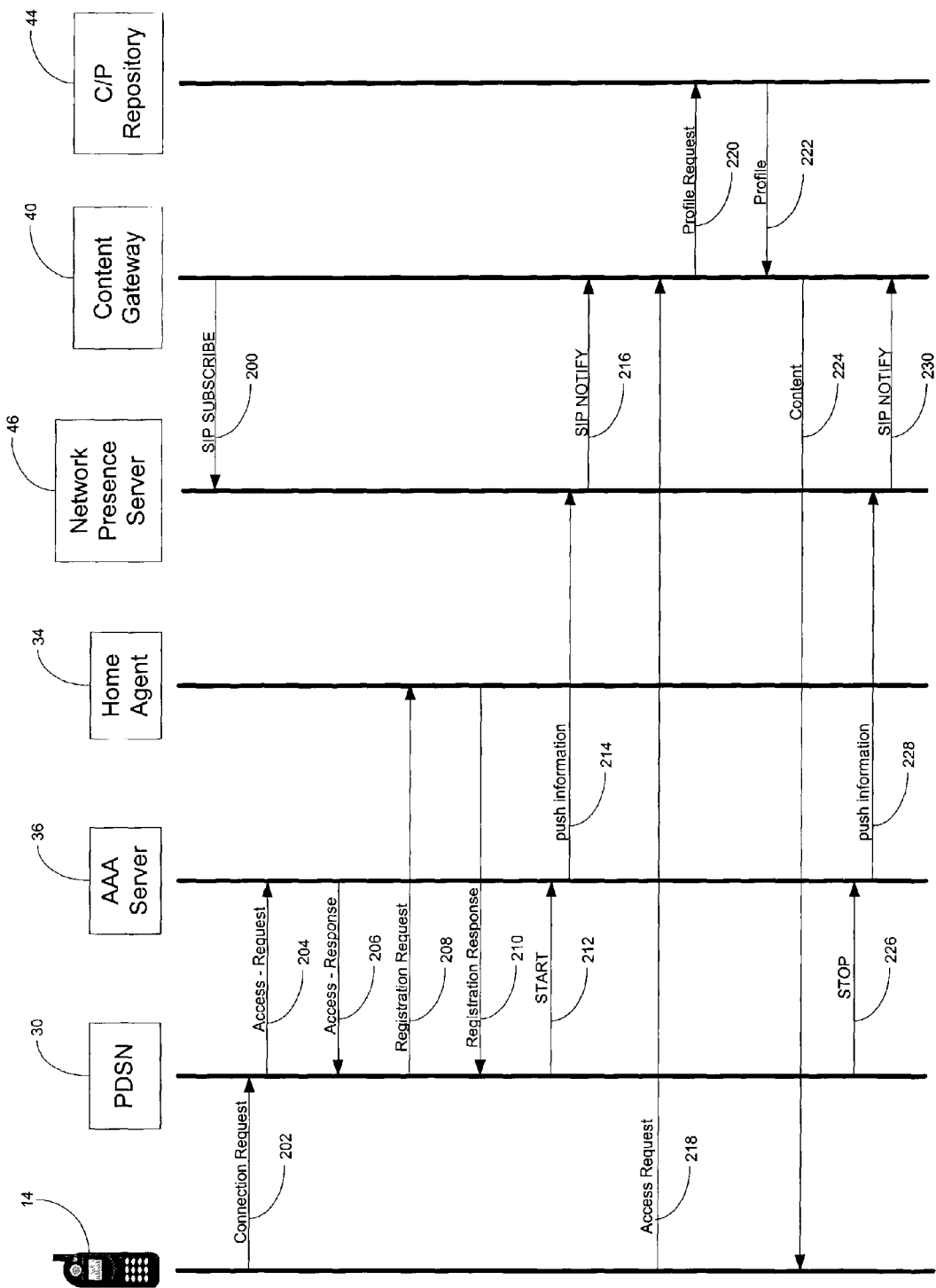
FIG. 4 is a simplified call flow diagram, in accordance with an exemplary embodiment of the present invention.

FIG. 4 is a simplified call flow diagram further illustrating an exemplary operation. At step 200, network presence server 46 receives a SIP SUBSCRIBE message from content gateway 42. The SIP SUBSCRIBE message of step 200 identifies content gateway 42 as the destination or subscribing application to receive network presence information. The SIP SUBSCRIBE message also specifies which selected network presence information content gateway 42 is to receive and when content gateway 42 is to be notified. In this example, the SIP SUBSCRIBE message specifies that content gateway 42 is to be notified of the NAI and IP address of each customer using home agent 34 whenever the customer's session begins or ends.

A customer using wireless customer device 14 wishes to access content available on content server 40. For example, the customer may wish to access Web content at a URL corresponding to content server 40. In this case, wireless customer device 14 is configured to use the Wireless Application Protocol (WAP) to access such content, and content gateway 42 serves as the WAP gateway for content server 40.

To begin the desired data session, wireless customer device 14 transmits a connection request that is received by PDSN 30, as indicated by step 202. The connection request includes the customer's NAI and password. For purposes of authentication, PDSN 30 sends the NAI and password to AAA server 36 in a RADIUS Access-Request message, as indicated by step 204. In response, AAA server 36 determines that the NAI and password are valid and so signals PDSN 30 in a RADIUS Access-Response message, as shown by step 206.

In this example, wireless customer device 14 uses Mobile IP and is assigned to home agent 34. Accordingly, in step 208, PDSN 30 sends a Mobile IP Registration Request to home agent 34. In response, home agent 34 dynamically assigns an IP address to wireless customer device 14. In step 210, home agent 34 sends PDSN 30 a Mobile IP Registration Response that includes the IP address dynamically assigned to wireless customer device 14.

In accordance with the RADIUS accounting protocol, PDSN 30 then sends a RADIUS accounting START message to AAA server 36, as indicated by step 212. In this example, AAA server 36 acts as a network presence monitor. Accordingly, AAA server 36 extracts network presence information, including the customer's NAI, IP address, and home agent address, from the RADIUS accounting START message of step 212 and pushes the network presence information to network presence server 46, as indicated by step 214.

Network presence server 46 receives the network presence information and determines that it meets the criteria set forth in the SIP SUBSCRIBE message of step 200, in that a customer assigned to home agent 34 has just begun a new data session. Accordingly, network presence server 46 sends content gateway 42 a SIP NOTIFY message, as indicated by step 216. The SIP NOTIFY message contains the selected network presence information specified in the SIP SUBSCRIBE message of step 200, namely, the customer's NAI and IP address and an indication that the customer has just begun a data session. In this way, content gateway 42 is notified that this particular IP address is valid and corresponds to a particular NAI.

In step 218, wireless customer device 14 sends content gateway 42 an access request. In this example, the access request, which may use the HyperText Transfer Protocol (HTTP), requests access to content at a URL corresponding to content server 40. The access request also identifies a destination address to receive the content, namely, the IP address dynamically assigned to customer wireless device 14. The access request may also identify the customer by NAI. In addition, the access request may identify a profile of device capabilities and/or customer preferences available from C/P repository 44.

Content gateway 42 determines whether the destination address provided in the access request of step 218 corresponds to a valid IP address identified by network presence server 46. In this case, content gateway 42 determines that the destination address is valid because it corresponds to the valid customer IP address from the SIP NOTIFY message of step 216. The SIP NOTIFY message of step 216 also identified the NAI corresponding to the IP address. Thus, if the access request of step 218 includes an NAI, content gateway 42 may also determine whether the NAI of the access request matches the NAI corresponding to the IP address according to the information content gateway 42 received from network presence server 46. In this way, content gateway 42 is able to validate the access request of step 218.

Once the access request of step 218 is validated, content gateway 42 obtains the requested content from content server 40. Content gateway 42 may also obtain a profile corresponding to the customer from C/P repository 44. The profile may specify capabilities of wireless customer device 14 and/or customer preferences. Content gateway 42 may be able to identify the profile to use from the information provided in the access request of step 218. Alternatively, content gateway 42 may be able to identify the profile to use based on the network presence information obtained from network presence server 46. In any event, content gateway may request the appropriate profile from C/P repository 44, as indicated by step 220, and C/P repository may provide the requested profile, as indicated by step 222.

In step 224, content gateway 42 provides wireless customer device 14 with the content requested in the access request of step 218. In so doing, content gateway 42 may tailor the content provided to wireless customer device 14 based on the profile it received in step 222. This tailoring may include transcoding or rendering the content to accommodate the particular capabilities of wireless customer device 14 and/or the particular preferences of the customer.

At some point, the data session of wireless customer device 14 ends. This may occur, for example, because the device 14 has logged out, been turned off, moved out of range, or been dormant for a certain period of time. When the data session ends, PDSN 30 sends a RADIUS accounting STOP message to AAA server 36, as indicated by step 226. AAA server 36, in turn, extracts network presence information from the RADIUS accounting STOP message, including the NAI and IP address, and pushes the information to network presence server 46, as indicated by step 228. Network presence server 46 then sends content gateway 42 a SIP NOTIFY message indicating that the NAI and IP address have ended the data session, as indicated by step 230. As a result, content gateway 42 no longer treats the IP address as a valid destination address for providing content and no longer applies the profile previously associated with that IP address. If content gateway 42 thereafter receives an access request having that IP address as its destination address, content gateway 42 may determine that the IP address either belongs to a different customer, in which case content gateway 42 should have already received network presence notification that the IP address corresponds to a different customer NAI, or is invalid. If content gateway 42 is not able to validate the IP address presented in an access request, then content gateway 42 may refuse to provide the requested content to the IP address.

3. Call State Server

Network presence server 46 and/or central network presence server 48 may also maintain more detailed call state information for customer devices, such as wireless customer device 14. Such call state information may include whether a customer device is engaged in a data session, whether the data session is active or dormant, and whether the customer device is engaged in one or more voice calls. In this way, network presence server 46 and/or central network presence server 48 may function as a call state server that other network elements can query to obtain call state information for customer devices, such as wireless customer device 14.

The call state server may obtain the state of a customer device's data session, i.e., whether it is active or dormant, in the manner described above. For example, AAA server 36 may push to the call state server information from RADIUS accounting START messages to indicate when data sessions become active and may push information from RADIUS accounting STOP messages to indicate when data sessions become dormant.

SCP 26 may keep track of the number of voice calls customer devices, such as wireless customer device 14, is engaged in and may provide this information to the call state server. For example, MSC 22 may be provisioned with triggers that cause it to signal SCP 26 whenever a customer device that it is serving, such as wireless customer device 14, originates a call, answers a call, or ends a call. In this way, SCP 26 will know when device 14 is engaged in voice calls and how many voice calls device 14 is engaged in. SCP 26 may push this information to the call state server at appropriate times, such as whenever a change in call state occurs. Alternatively, the call state server may query SCP 26 to obtain the call state information at appropriate times.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. In a packet-switched network in which a network access element provides network access to customers and sends status messages to an accounting element regarding services provided to said customers, a method for network presence notification from a network presence server to a destination, wherein said destination provides content to customers over said packet-switched network, said method comprising:

said destination registering with said network presence server, wherein registration specifies network presence information to be supplied to said destination;

monitoring said status messages to obtain selected network presence information, at least in part, from said status messages;

forwarding said selected network presence information to said network presence server;

said network presence server comparing received network presence information with said registration;

providing said selected network presence information matching said registration to said destination, said destination including a content gateway for providing content to said customers, wherein said selected network presence information includes an identification of an accessing customer and a network address temporarily assigned to said accessing customer; and said destination validating an attempt by said accessing customer to access said content according to said selected network presence information received from said network presence server.

2. The method of claim 1, wherein said network access element is a network access server.

3. The method of claim 2, wherein said network access server is a packet data serving node (PDSN).

4. The method of claim 1, wherein said accounting element is an accounting server.

5. The method of claim 4, wherein said accounting server is an authentication, authorization, and accounting (AAA) server.

6. The method of claim 1 wherein said content gateway provides streaming multimedia content to said customers.

7. The method of claim 1, wherein said at least one destination includes a troubleshooting application.

8. The method of claim 1, wherein said network address is an internet protocol (IP) address.

9. The method of claim 8, wherein said IP address is dynamically assigned to said given customer.

10. The method of claim 1, wherein said identification includes a network access identifier (NAI).

11. The method of claim 1 wherein said destination registers by sending a SIP subscribe message.

12. The method of claim 1 wherein said validating step is comprised of:

receiving a network presence message, said network presence message identifying a customer and a valid network address of said customer;

receiving an access request after receiving said network presence message, said access request requesting access to selected content and identifying a destination network address;

in response to said access request, determining whether said destination network address corresponds to said valid network address; and if said destination network address corresponds to said valid network addresses, providing said selected content to said destination network address.

13. The method of claim 12, further comprising:
obtaining a profile associated with said customer.

14. The method of claim 13, further comprising:
receiving said selected content from a content server; and
tailoring said selected content based on said profile.

\* \* \* \* \*